United States Patent

[11] 3,633,006

[72] Inventor Wahei Inoue
 Tokyo, Japan
[21] Appl. No. 857,388
[22] Filed Sept. 12, 1969
[45] Patented Jan. 4, 1972
[73] Assignee Kabushiki Kaisha Maekawa Seisakusho
 Tokyo, Japan

[54] AUTOMATIC CONTROL DEVICE
 3 Claims, 3 Drawing Figs.
[52] U.S. Cl. ................................................ 235/151,
 235/151.1, 236/1 E
[51] Int. Cl. ...................................................... G05b 11/18
[50] Field of Search ............................................ 235/151,
 151.1; 236/1 E

[56] References Cited
 UNITED STATES PATENTS
 2,714,171 6/1955 Kingsley ...................... 236/1 E
 3,050,610 8/1962 Osen ........................... 236/1 E Primary Examiner—Eugene G. Botz
Assistant Examiner—R. Stephen Dildine, Jr.
Attorney—Stevens, Davis, Miller & Mosher ABSTRACT: An automatic control device comprising a control chamber, a detection section provided in said control chamber for detecting physical quantities of an objective to be controlled, a setting section for comparing values detected at said detection section with a quantity set previously and detecting a deviation of a detected quantity from said set quantity in the form of analogue quantities, an amplifier integrator for amplifying said analogue quantities and integrating the same with respect to time, a polarity discriminator for converting the integrated value into digital signals, and an addition and subtraction circuit for effecting addition or subtraction of said digital signals for successively controlling operation sections in said control chamber.

AUTOMATIC CONTROL DEVICE

This invention relates to automatic control devices. More particularly, the invention is concerned with an automatic control device for effecting automatic control of operation sections in steps by detecting analogue quantities of a controlled objective varying linearly and continuously, integrating a deviation of a detected value from a set value with respect to time, and converting the analogue quantities into digital quantities having positive or negative inverse-time-limit characteristics in which the time interval is in inverse proportion to the deviation.

In effecting control of physical quantities of a controlled objective (for example, a temperature or pressure) in steps so as to correct a deviation of a detected value from a set value, it has hitherto been customary to use an integrator for effecting integration of said deviation which is restored to its original position following completion of one definite integration. Therefore, the integrator has to have a complicated mechanism so as to permit the next following integration to be performed. This has often caused errors to occur in the operation of the device. Also, conventional analogue-to-digital converters cannot accommodate an increase in the number of steps in effecting step by step control, so that it has been difficult to effect multistep control.

Accordingly, an object of the present invention is to provide an automatic control device which permits multistep control to be effected efficiently.

In parallel operation of multistage compressors for a plant of large capacity in refrigeration installations or the like, the refrigeration system used relies on evaporation. When there are variations in the temperatures set for several rooms to be refrigerated, the temperatures or pressures of the detection sections also vary from one to another. This makes it necessary to systematically divide compressors into groups with each group being assigned to rooms set at an equal temperature and to effect control individually for each group. Also, in effecting volume control of the compressors, a detection section for temperature or pressure may be provided for each stage in which volume control is effected or a detection section may be provided for each compressor. The values set for the compressors are varied slightly from one compressor to another so that the compressors may be actuated successively. This arrangement makes it very difficult to effect control of the values previously set. In addition, the arrangement has a disadvantage in that the values set undergoes changes during operation, making it impossible to operate the compressors in a stable manner.

Another object of the invention is therefore to provide an automatic control device which uses a detector provided only in a low-pressure refrigerant vessel mounted in a position to be used commonly for a compression system and an evaporation (refrigeration) system of a refrigeration installation, so to thereby effect multistep control of groups of compressors provided in the compression system.

Additional objects as well as features and advantages of this invention will become evident from the description set forth hereinafter when considered in conjunction with the accompanying drawings, in which.

Figure 1:
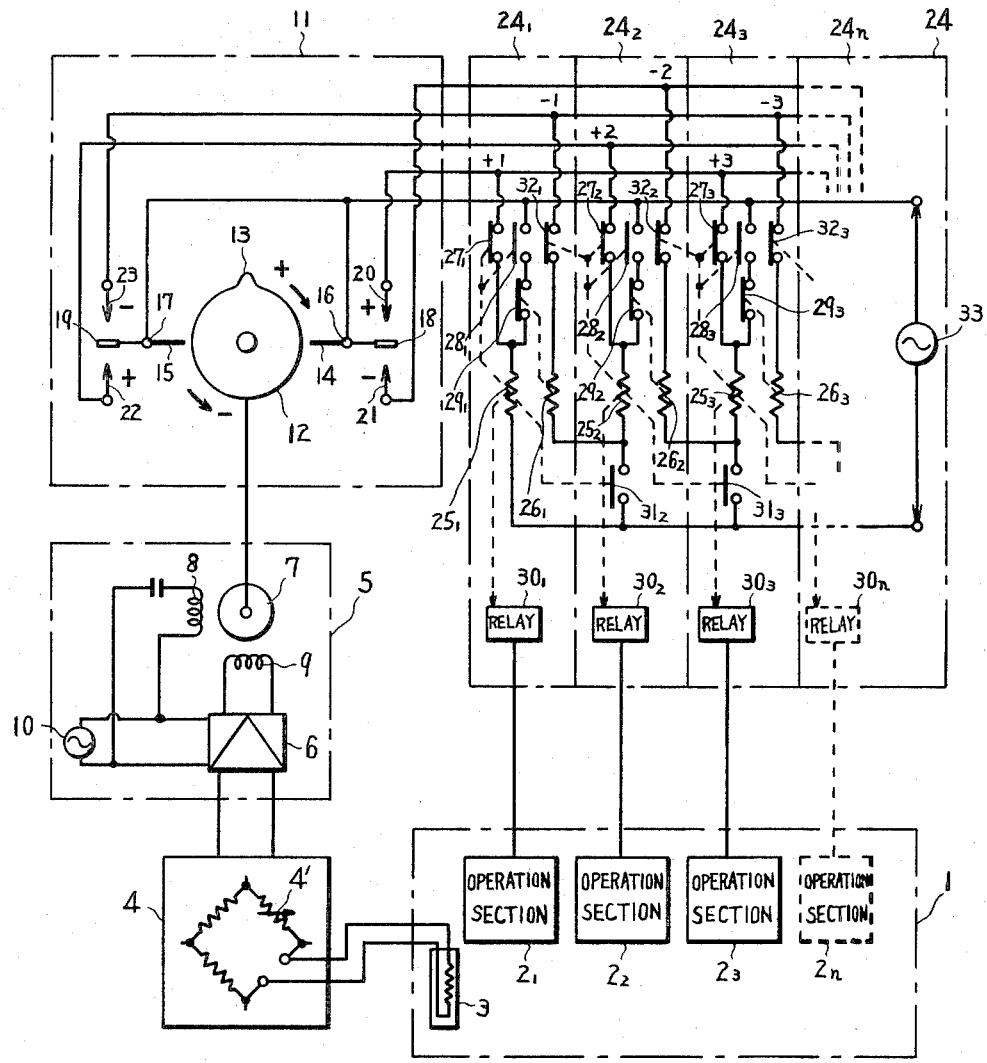
FIG. 1 is a diagram of a control circuit according to this invention.

The construction of a device embodying this invention will be explained with reference to FIG. 1. A control chamber 1 is provided which is filled with an objective to be controlled such as a liquid or gas. Said control chamber contains therein operation sections $2_1$ to $2_n$ for compressors or heaters which are $n$ in number, said control sections being spaced apart from one another a predetermined distance. The control chamber 1 functions such that the objective to be controlled contained therein can be maintained under predetermined conditions by controlling in steps said operation sections $2_1$ to $2_n$. Provided in said control chamber 1 is a detection section 3 which detects the physical quantities of the objective to be controlled. This detection section 3 takes the form of a thermometer, for example, in this embodiment which is mounted in the control chamber 1. The output side of said detection section 3 is connected to the input side of a setting section 4 which can, for example, be a bridge circuit comprising a variable resistor 4' on one side in this embodiment which can set a temperature beforehand. Said setting section 4 produces as its output positive or a negative signals in conformity with the detected value of the objective to be controlled as detected by said detection section 3. Connected to the output side of the setting section 4 through an amplifier 6 of an amplifier integrator 5 is a servomotor 7 which comprises two sets of windings 8 and 9 having a phase angle of 90°. A constant voltage is applied from a power source 10 to the winding 8 of one phase and a control voltage is applied to the winding 9 of the other phase through said amplifier 6.

Said servomotor 7 has a rotary shaft which is connected to a cam plate 12 of a polarity discriminator 11 which is formed with a projection 13 on its outer periphery. Two movable contact members 14 and 15 are mounted in positions diametrically opposed to each other near the outer periphery of the cam plate 12 and spaced apart from the outer periphery of the cam plate 12 by a small clearance. Said movable contact members 14 and 15 are adapted to be moved in pivotal motion by the projection 13 about pivots 16 and 17 respectively as the cam plate 12 rotates. Fixed contacts 20, 21 and 22, 23 are mounted on opposite sides of a movable contact 18 and a movable contact 19 respectively which are disposed at the forward ends of said movable contact members 14 and 15 respectively. Thus, the movable contact 18 is brought into engagement with the fixed contact 20 when the cam plate 12 rotates in a positive direction or in the clockwise direction in FIG. 1 to produce a positive odd-numbered pulse signal and further rotation of the cam plate 12 of one-half revolution through 180° brings the movable contact 19 into engagement with the fixed contact 22 to produce a positive even-numbered pulse signal.

Similarly, as the cam plate 12 rotates in a reverse direction or in the anticlockwise direction in FIG. 1, the movable contact 19 is brought into engagement with the fixed contact 23 to produce a negative odd-numbered pulse signal and further rotation of the cam plate 12 of one-half revolution through 180° brings the movable contact 18 into engagement with the fixed contact 21 to produce a negative even-numbered pulse signal. The pulse signals produced by the engagement of the movable contacts 18 and 19 with the fixed contacts 20, 21, 22, and 23 are outputs of the setting section 4 which represent analogue quantities converted into digital signals.

The pulse signals produced are transmitted to an adding and subtracting circuit 24 which comprises a plurality of substantially similar relay circuits $24_1$ to $24_n$ starting with the relay circuit $24_1$ which effects addition or subtraction by a first positive or negative signal and ending with the relay circuit $24_n$ which effects addition or subtraction by an $n$th positive or negative signal. Said relay circuit $24_1$ comprises an addition relay $25_1$ and a subtraction relay $26_1$, and a normally closed contact $27_1$ is opened as the addition relay $25_1$ is energized so as to close a selfholding normally open contact $28_1$ and a normally open contact $31_2$ of a next relay circuit $24_2$. Energization of the addition relay $25_1$ further closes an operation section relay $30_1$ for energizing said operation section $2_1$. Energization of the subtraction relay $26_1$ opens a normally closed contact $29_1$. A normally closed contact $32_1$ connected in series to the subtraction relay $26_1$ is opened as an addition relay $25_2$ of a next relay circuit $24_2$ is energized. The same process as described above is repeated with relay circuits $24_2$ to $24_n$.

The operation of the device according to this invention constructed as aforementioned will now be explained. The variable resistor 4' of the setting section is adjusted beforehand to set the setting section 4 at a predetermined value.

Assuming that a physical change such as a reduction in temperature has occurred in the control chamber, the change in temperature of detected by the detection section 3 and an output of the detection section is applied to the setting section 4. The output of the detection section 3 applied to the setting section 4 is compared with the set value to determine if the change is positive or negative. If the detected temperature is reduced below the set value, the change is positive and an output voltage signal of the setting section 4 is transmitted to the winding 9 through the amplifier 6 so as to rotate the servomotor 7 in a positive direction. The rate of revolution of the servomotor 7 may vary depending on the size of a deviation of the temperature detected by the detection section 3 from the value set at the setting section 4, and the cam plate 12 rotates in the positive direction an amount corresponding to the size of said deviation. Thus, the angle of rotation of the projection 13 formed in the cam plate 12 shows an integrated value of the deviation with respect to time.

Rotation of the cam plate 12 in the positive direction causes the projection 13 to close the first positive contact 20 to produce a positive pulse signal. In cases where none of the operation sections $2_1$ to $2_n$ are operating at this time, the addition relay $25_1$ is energized through the normally closed contact $27_1$ of the relay circuit $24_1$. Energization of the addition relay $25_1$ simultaneously opens the normally closed contact $27_1$ and closes the normally open contact $28_1$. Thus, the addition relay $25_1$ is rendered self-holding and the operation section relay $30_1$ is closed, so that the operation section $2_1$ is actuated. If there is still a difference between the detected value and the set value after the operation section $2_1$ has been actuated, the cam plate 12 is caused to make a one-half revolution through 180° by the servomotor 7 so that the projection 13 closes the contact 22 to energize the addition relay $25_2$ of the relay circuit $24_2$. Energization of the addition relay $25_2$ closes the operation section relay $30_2$ and actuates the operation section $2_2$. If there is still a difference between the detected value and the set value, the cam plate 12 rotates as many times as required so as to thereby render the operation sections $2_3$ to $2_n$ operative successively.

It is to be understood that if the operation sections up to the $m$th operation section have already been rendered operative, actuation begins with the $m+1$ operation section ($2_{m+1}$).

Assuming that there is a physical change such as a rise in temperature above a set level in the control chamber 1, said rise in temperature is detected by the detection section 3 and the detected value is compared with the set value. Accordingly, the servomotor 7 rotates in a negative or counterclockwise direction and the cam plate 12 also rotates in the negative or counterclockwise direction, with the projection closing the contact 23.

If the operations sections up to the $m$th operation section have already been rendered operative by this time, the subtraction relay $26_m$ is energized because the normally closed contact $32_m$ and the normally open contact $31_{m+1}$ are closed. This opens the normally closed contact $29_3$ and deenergizes the addition relay $25_m$ so that the operation relay $30_m$ is opened and the operation section $2_m$ is rendered inoperative. If there is still a difference between the detected value and the set value, the cam plate 12 continues to rotate to render the operation sections $2_{m-1}$, $2_{m-2}$ ...... inoperative successively till the difference is removed.

Since the contacts 20, 21 and contacts 22, 23 are disposed in positions diametrically opposed to each other with respect to the rotation of the cam plate 12, the intervals of time at which said pulse signals are produced are determined by integrating a difference between the set value and the detected value with respect to time. Thus, pulses of inverse-time-limit-characteristics are produced, in which the time interval is in inverse proportion to the deviation. That is, if the difference is great the intervals of time for generation of the pulse signals are short, so that addition or subtraction is effected quickly upon application of the pulse signals to the addition and subtraction circuit 24.

In cases where a detected value exceeds a set value immediately after the contact 20 is closed by rotation of the servomotor 7 in the positive direction and a first positive odd-numbered pulse signal and a positive third pulse signal, for example, are transmitted to the relay circuit $24_3$, the direction of rotation of the servomotor 7 may be reversed to produce a negative even-numbered pulse signal, a negative fourth pulse signal, for example. However, since the contact $31_4$ remains open, no subtraction is effected at the addition and subtraction circuit 24. Moreover, a negative deviation in which the detected value is higher than the set value is brought into being so that the servomotor 7 makes one-half revolution through 180° in the negative direction to supply a third negative pulse signal to the relay circuit $24_3$. This pulse signal energizes the subtraction rely $26_3$ and renders the addition relay $25_3$ inoperative so that the addition and subtraction circuit 24 may effect subtraction. In cases where a negative deviation occurs and the direction of rotation of the servomotor 7 is reversed immediately after the cam plate 12 is rotated in the positive direction to close the contact 20 and produce a third pulse signal, for example, so as to render the addition relay $30_3$ operative, no subtraction is effected as explained previously. Moreover, an odd-numbered pulse signal is produced when a positive deviation occurs and the cam plate 12 rotates in the positive direction to close the contact 20, no addition is effected in the addition and subtraction circuit 24 because the normally closed contact $27_3$ of the relay circuit $24_3$ remains open. The positive deviation causes the servomotor 7 to make one-half revolution through 180° positive direction to close the contact 22 and produce a positive even-numbered signal. The fourth pulse signal closes the relay circuit $24_4$ so that the addition and subtraction circuit 24 effects addition.

From the foregoing description, it will be appreciated that a sudden change in the direction of movement of the servomotor 7 due to the occurrence of a positive or negative deviation of a detected value from a set value does not cause addition or subtraction to be effected so long as integrated value of the deviation does not reach a predetermined level. This is conductive to prevention of disturbances of control of an objective to be controlled.

One embodiment of this invention will be explained with reference to FIG. 2. Like reference characters designate similar parts in FIGS. 1 and 2.

Figure 2:
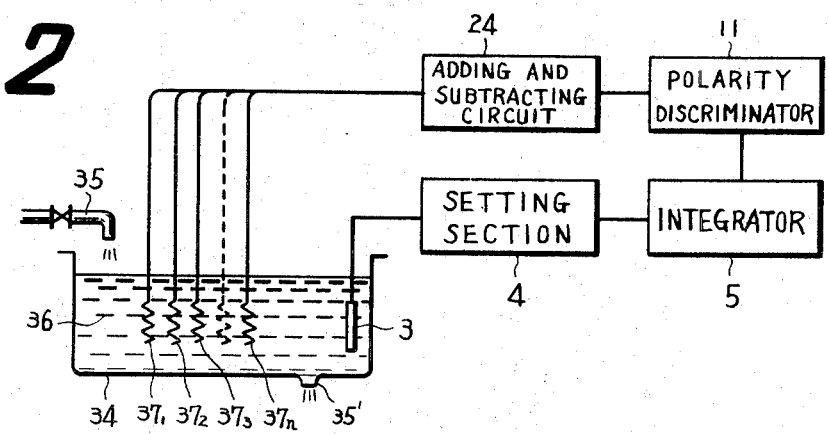
FIG. 2 is a block diagram of a temperature control device.

In FIG. 2, there is shown a liquid tank 34 having an inlet port 35 disposed above the tank and an outlet port 35' formed in the bottom of the tank. The liquid tank 34 is filled with a liquid 36 heated to a predetermined temperature which constitutes an objective to be controlled. Heaters $37_1$ to $37_n$ corresponding to the operation sections $2_1$ to $2_n$ of FIG. 1 as well as a detection section 3 are inserted in the tank 34. The detection section 3 is connected to a setting section 4 which is identical with the setting section 4 of FIG. 1. The detection section 3 is further connected to said heaters $37_1$ to $37_n$ through an amplifier integrator 5, polarity discriminator 11 and addition and subtraction circuit 24.

The embodiment described above operates in the same manner as the device shown in FIG. 1.

Figure 3:
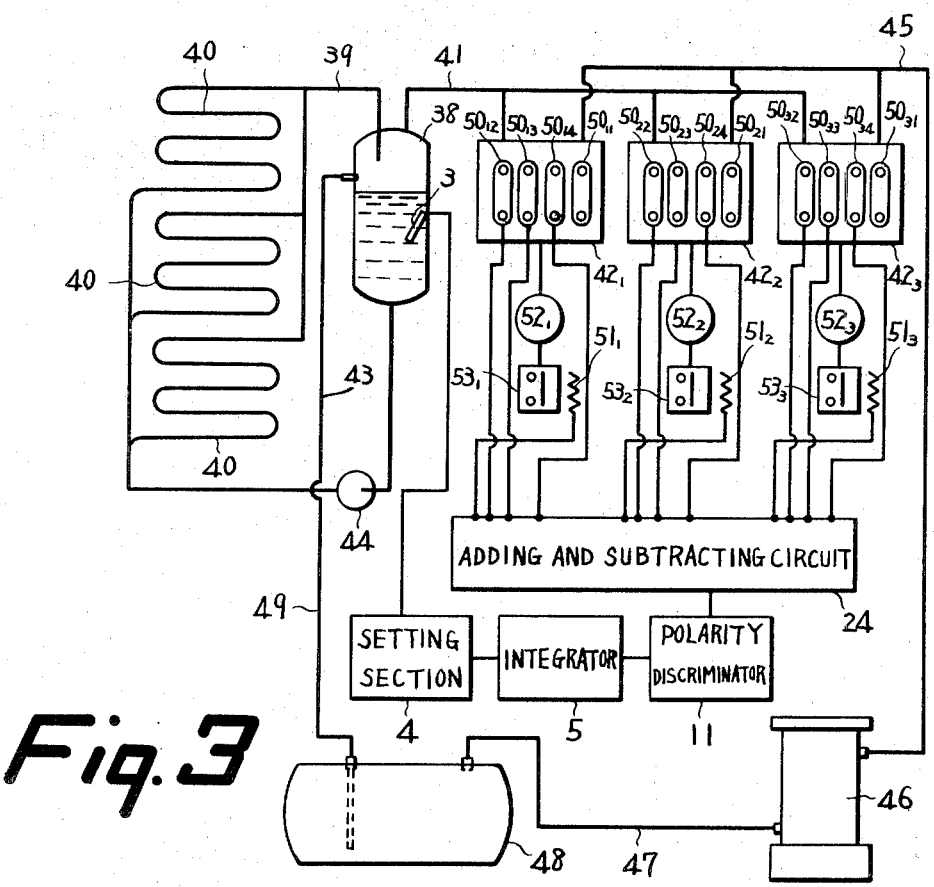
FIG. 3 is a block diagram of a control system for a refrigeration installation.

Another embodiment of this invention will be explained with reference to FIG. 3. Like reference characters designate similar parts in FIGS. 1 and 3.

Connected to the upper portion of a low-pressure refrigerant vessel 38 is one end of a liquid gas-mixing return line 39 which is connected at the other end to the exhaust ends of a number of evaporators 40 connected in parallel to one another. Also connected to the upper portion of said low-pressure refrigerant vessel 38 is a gas suction line 41 which is connected to suction ends of a number of compressors $42_1$, $42_2$ and $42_3$. A liquid refrigerant supply line 43 is connected to the bottom of the low-pressure refrigerant vessel 38 and a liquid refrigerant delivery pump 44 is mounted on said liquid refrigerant supply line 43. The pump 44 is connected at the other end to the suction ends of a number of said evaporators connected in parallel to one another. The exhaust ends of said compressors $42_1$, $42_2$ and $42_3$ are connected to a header or common high-pressure gas outlet line 45 which is connected to a condenser 46. Said condenser 46 is connected through a condensate outlet line 47 to a high-pressure refrigerant vessel 48 which in turn is connected through a liquid outlet line 49 to said low-pressure refrigerant vessel 38.

Said compressors $42_1$, $42_2$ and $42_3$ are provided with four cylinders $50_{11}$, $50_{12}$, $50_{13}$ and $50_{14}$, $50_{21}$, $50_{22}$, $50_{23}$ and $50_{24}$, and $50_{31}$, $50_{32}$, $50_{33}$ and $50_{34}$ respectively. Of these cylinders, the cylinders $50_{12}$, $50_{13}$ and $50_{14}$, $50_{22}$, $50_{23}$ and $50_{24}$ and $50_{32}$, $50_{33}$ and $50_{34}$ are connected to the operation section relays $2_1$ to $2_n$ of the addition and subtraction circuit 24 shown in FIG. 1 together with relays $51_1$, $51_2$ and $51_3$. The cylinders $50_{11}$, $50_{21}$ and $50_{31}$ are first actuated of all the cylinders of the compressors $42_1$, $42_2$ and $42_3$ when contacts $53_1$, $53_2$ and $53_3$ of motors $52_1$, $52_2$ and $52_3$ respectively are closed. Said contacts $53_1$, $53_2$ and $53_3$ are closed when said relays $51_1$, $51_2$ and $51_3$ are energized.

A temperature detection section 3 similar to that of FIG. 1 is inserted in the refrigerant in liquid form in the low-pressure refrigerant vessel 38 and connected to a temperature setting section 4, thence to an amplifier integrator 5, polarity discriminator 11 and addition and subtraction circuit 24.

The operation of the embodiment described above will be explained. In a refrigeration installation, a refrigerant in liquid form is supplied from the high-pressure refrigerant vessel 48 containing a liquid ammonia to the low-pressure refrigerant vessel 38. The liquid refrigerant in the low-pressure refrigerant vessel 38 is drawn by the pumping action of the delivery pump 44 into the liquid refrigerant supply line 43 and supplied to the evaporators 40 where the liquid refrigerant is changed into a gaseous state while absorbing heat. The refrigerant gassified in the evaporators is returned together with ungassified liquid refrigerant to the vessel 38 through the return line 39. The gas in the vessel 38 is drawn by suction through the suction line 41 into the suction ends of the compressors $42_1$, $42_2$ and $42_3$. On the other hand, the ungassified liquid refrigerant is collected in the bottom portion of the vessel 38 for recirculation. The gas introduced into the compressors $42_1$, $42_2$ and $42_3$ through the suction line 41 are compressed therein into a high pressure gas which is taken out through the outlet line 45 into the condenser 46 and changes to a liquid state and then collected in the high-pressure refrigerant vessel 48 to be supplied to the low-pressure refrigerant vessel 38 when required.

If the temperature of the liquid refrigerant in the vessel 38 rises above a predetermined temperature level, the temperature detected by the temperature detection section 3 is compared with a predetermined temperature set at the temperature-setting section 4 and a difference between the detected temperature and the set temperature is transmitted in the form of a positive pulse signal or negative pulse signal to the addition and subtraction circuit 24 through the amplifier integrator 5 and polarity discriminator 11 to successively render the compressors $42_1$, $42_2$ and $42_3$ either operative or inoperative. That is, if there is a positive difference between the detected temperature and the set temperature, the relay $51_1$ is closed and the contact $53_1$ is also closed to thereby render the motor $52_1$ operative. Upon rotation of the motor $52_1$, the cylinder $50_{11}$ of the compressor $42_1$, is first actuated and then the cylinders $50_{12}$, $50_{13}$ and $50_{14}$ and the cylinders $50_{21}$, $50_{22}$ and $50_{23}$ of the compressor $42_2$ and so on and so forth are successively actuated in the order indicated.

If a negative difference occurs between the detected temperature and the set temperature when the cylinders of the compressors have been rendered operative up to the cylinder $50_{23}$ of the compressors $42_2$, the cylinders $50_{23}$ and $50_{22}$ are successively rendered inoperative. If there is still a difference, the relay $51_2$ is opened and the motor $52_2$ is rendered inoperative, thereby rendering the cylinder $50_{21}$ also inoperative.

If there is a minute deviation of value or a minute difference between the detected temperature and the set temperature or if the difference is so small that a negative difference occurs immediately after the cylinder $50_{23}$ is rendered operative upon occurrence of a positive difference, the cylinder $50_{23}$ is not rendered inoperative, thereby preventing disturbances which are liable to occur in controlling cylinders as described with reference to FIG. 1.

From the foregoing description, it will be appreciated that in the present invention physical quantities of an objective to be controlled are detected by a detection section and compared with a quantity set at a setting section, and that a positive or negative difference between the detected quantity and the set quantity is integrated with respect to time. When the integrated value has reached a predetermined level, the value is determined if they are positive or negative and converted into digital quantities which are applied successively as signals to an addition and subtraction circuit where addition or subtraction is effected so as to maintain the objective to be controlled in a control chamber at a level previously set.

An advantage of the device according to this invention is that it can effect control such that physical quantities of an objective to be controlled can be maintained at a set value at all times by means of a simple mechanism. An additional advantage lies in the fact that integration of a positive or negative deviation from a set value is initiated right away even immediately after conversion from a positive to negative operation or vice versa, thereby preventing errors in operation. This permits to readily effect addition or subtraction. Thus, the control device according to this invention permits to effect control in a stable manner particularly in cases where the response time is long and control is effected in steps.

When the device according to this invention has application in a refrigeration installation, an evaporation system and a compression system are maintained in communication with each other through a low-pressure refrigerant vessel. The temperature of the low-pressure refrigerant vessel is detected at a detection section and at the same time an analogue deviation of a detected value from a set value is integrated and converted into digital quantities at a polarity discriminator, so that the cylinders can be controlled in steps by digital signals produced. It will be appreciated that the present invention permits to control efficiently a number of compressors by detecting only the temperature of the refrigerant contained in the low-temperature refrigerant vessel.

I claim:

1. An automatic control device, comprising: a control chamber; means generating a signal proportional to an environmental condition of a substance in said control chamber; means for setting a predetermined reference quantity; means comparing said generated signal with said reference quantity and detecting a deviation of said generated signal from said reference quantity in the form of an analogue signal; means for amplifying said analogue signal; means for integrating said amplified analogue signal with respect to time; a polarity discriminator for determining the polarity of said integrated analogue signal with respect to said reference quantity when said integrated signal has reached a predetermined level; means producing digital signals the polarity of which is dependent upon the polarity of said integrated signal; and means for adding and subtracting successive digital signals; means controlling said environmental condition in said control chamber; and means connecting the outputs of said adding and subtracting means with said control means, whereby the outputs of said adding and subtracting means control said control means.

2. An automatic control device as defined in claim 1 in which said control chamber is a liquid tank filled with a liquid of which the temperature is an objective to be controlled so as to be maintained at a predetermined temperature, and said operation means are heaters.

3. An automatic control device as defined in claim 1 in which said control chamber is a low-pressure refrigerant vessel connected on one hand to evaporators of an evaporation system and on the other to multicylinder compressors of a compression system, and said operation means are cylinders of said multicylinder compressors.